United States Patent

Wu

[11] Patent Number: 5,931,329
[45] Date of Patent: Aug. 3, 1999

[54] DEVICE TO SELECTIVELY CHANGE THE HEIGHT OF A COFFEE CARAFE

[75] Inventor: Hsinhan Wu, Tarpon Springs, Fla.

[73] Assignee: Melitta Haushaltsprodukte GmbH & Co. KG, Germany

[21] Appl. No.: 09/021,102

[22] Filed: Feb. 10, 1998

[51] Int. Cl.[6] .................................................. B65D 51/26
[52] U.S. Cl. .............................. 220/212; 99/299; 99/306; D7/399; 220/233
[58] Field of Search ..................................... 220/212, 234, 220/233, 377.1; 215/355; 99/299, 280, 323.3, 323, 306; D7/399, 317, 392, 392.1, 391

[56] References Cited

U.S. PATENT DOCUMENTS

| | | | |
|---|---|---|---|
| 4,108,053 | 8/1978 | Vink ........................................... | 99/306 |
| 4,138,936 | 2/1979 | Williams . | |
| 4,748,901 | 6/1988 | Burmeister ................................. | 99/306 |
| 4,764,391 | 8/1988 | Wasserman et al. . | |
| 4,898,090 | 2/1990 | Chan . | |
| 5,150,803 | 9/1992 | Cartellone . | |
| 5,170,694 | 12/1992 | Salomon .................................... | 99/299 |
| 5,476,183 | 12/1995 | Rielly . | |

*Primary Examiner*—Stephen K. Cronin
*Assistant Examiner*—Robin A. Hylton
*Attorney, Agent, or Firm*—Joseph C. Mason, Jr.

[57] ABSTRACT

A device to adapt a coffee carafe in its height so that it may be used on a plurality of coffee makers of differing designs. It includes a hinged carafe lid adaptable to fit a coffee carafe and having an internally threaded bore located at the center of the lid, through which is threaded a hollow screw which has a substantially flat or conically-shaped surface attached to its upper end. The surface has holes that fit over the hollow portion of the screw. The height of the surface can be adjusted by rotating it so that the threads elevate or depress the substantially flat or conically-shaped surface, thereby positioning the surface immediately beneath the output spout of the coffee maker or engaging an activation switch or anti-drip valve mechanism at any portion of the coffee maker. The device may utilize a frictionally engaged cylinder within the center bore of the lid instead of the preferred threaded embodiment of the device.

6 Claims, 2 Drawing Sheets

DEVICE TO SELECTIVELY CHANGE THE HEIGHT OF A COFFEE CARAFE

BACKGROUND OF THE INVENTION

1. Field of the Invention

The invention relates to a device to adapt a coffee carafe in its height so that it may be used on a plurality of coffee makers of differing designs.

2. Description of Related Art

Automatic drip coffee makers are very popular and common in the marketplace. Many coffee makers have activation switches, or anti-drip valve mechanisms, which enable the flow of coffee into the carafe only when a carafe is positioned in the machine. Usually the switch or mechanism is activated when the lid of the carafe comes into contact with the activation element, and thus activates the machine to permit the flow of coffee.

There is no standardized coffee maker nor is there a standardized position for the height of the reservoir and/or filter basket assembly over the decanter or carafe. Further, there is no standardized position for the height of the activation switch or anti-drip valve mechanisms among the numerous machines available in the marketplace. As a result, carafes and lids may not be interchangeable between the various coffee makers. Consequently, consumers must purchase a carafe with accompanying lid that is compatible for use with a specific coffee maker's machine.

There have been some attempts over recent years to provide adjustable lids for the purpose of varying the overall height of a carafe. Known related art include U.S. Pat. No. 5,476,186 to Reilly and U.S. Pat. No. 5,150,803 to Cartellone. Such related art do not eliminate the need to purchase adapters to effectively use an old carafe with a new coffee machine. Further, related art with adjustable height lids are generally limited in allowable incremental adjustments and do not ensure optimum engagement of the top surface of the carafe/lid assembly with an activation switch or anti-drip valve mechanism on the filter vessel or basket.

SUMMARY OF THE INVENTION

Therefore, it is an object of this invention to provide a device to adapt a coffee carafe in its height so that it may be used on coffee makers of differing designs.

The present invention includes a hinged carafe lid that is adaptable to fit a coffee carafe and that has an internally threaded bore located at the center of the lid, through which is inserted a hollow screw with external threads operationally mateable to the internally threaded bore of the lid. The screw has a substantially flat or conically-shaped surface attached to its upper end. The substantially flat or conically-shaped surface has holes that fit over the hollow portion of the screw. The height of the flat or conically-shaped surface can be adjusted by rotating it so that the threads elevate or depress the screw thus positioning the flat or conical surface so that its holes are immediately beneath the output spout of the coffee maker.

Another embodiment of the present invention includes the use of a cylinder, which has a flat or conically-shaped surface attached to its upper end, frictionally fitted within the internal surface of the lid's large center bore. The height of the flat or conically-shaped surface in an embodiment incorporating the frictionally engaged cylinder can be adjusted by directly elevating or depressing the flat or conically-shaped surface. Frictional engaged means can include surface to surface contact between the cylinder outside wall surface and the internal bore wall surface of the lid. Other possible frictional means can incorporate the use of an o-ring or v-ring or other ribbed gripping means between the cylinder wall surface and internal bore surface.

For machines wherein the flow of coffee is controlled by the activation of a switch or anti-drip valve mechanism in contact with a lid, the substantially flat or conically-shaped surface can be positioned to ensure optimum operation of the activation switch or anti-drip valve mechanism. The present invention allows for fine adjustments to ensure proper elevation and alignment of the flat or conically-shaped surface immediately underneath the output spout of the coffee maker and to ensure optimum operation of the coffee maker's activation switch or anti-drip mechanism.

A further object of the present invention is to provide a hinged carafe lid assembly as described above which is simple, economical, and easy to use.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
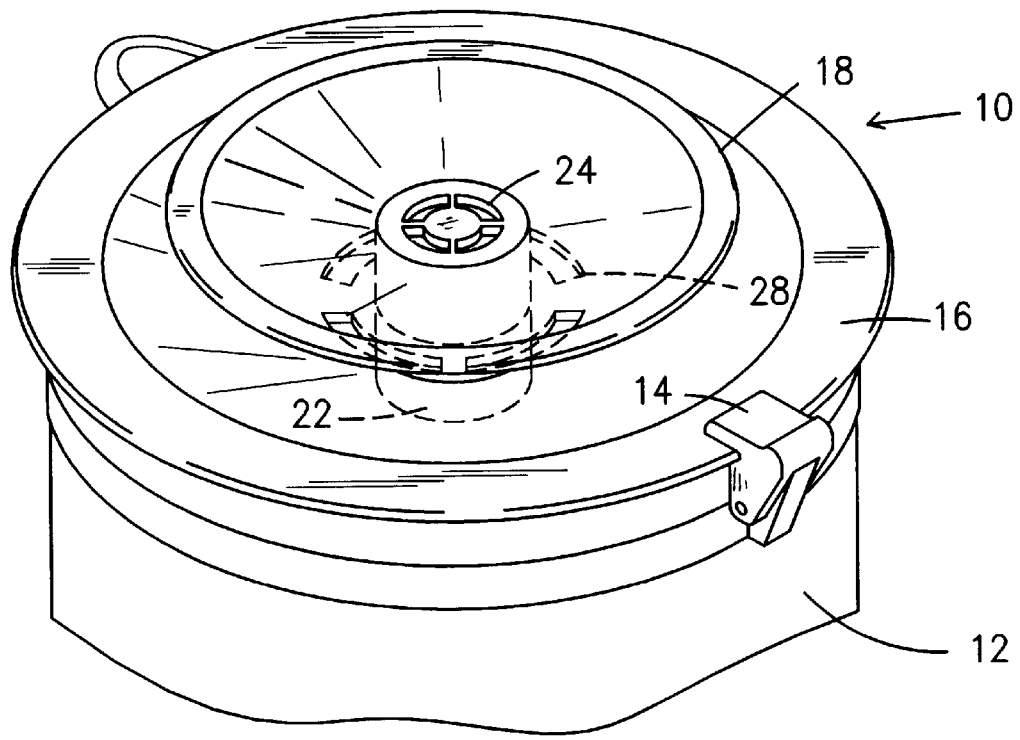
FIG. 1 is a perspective view of the device to selectively change the height of a coffee carafe incorporating a threaded adjustment means, the device being shown in position on a carafe.

This invention comprises an adjustable height lid for a carafe that is useful for coffee makers of differing designs. FIG. 1 shows the device 10 placed on a carafe 12. The lid 16 is shown detachably and hingedly connected to the carafe at a hinge area 14. The hollow screw with substantially flat or conically-shaped surface 18 at one end is shown with external threads which are engaged through the internal threads of the bore in the center of lid 16.

The threads, preferably should be according to the Unified Thread Standard or the older American Standard Threads. The newer Unified screw-thread standards are published by ANSI as American Standard Unified & American Screw Thread Publication B1.1-1974. It is within the scope of this invention for the thread-pitch design to incorporate non-unified standards so long as the pitch of the internal and external threads is sufficient to move the device vertically in an "up" or "down" position.

The hollow screw or cylinder portion of the device is preferably of circular cross-section and constant diameter, although other geometrical configurations may be used, such as rectangular cross-section and tapered from top to bottom.

As shown in FIG. 1, when positioned in a coffee maker, the substantially flat or conically-shaped surface 18 is elevated or depressed by rotating the threaded cylinder so as to locate holes 24 immediately underneath the output spout of the coffee maker or to position the flat or conically-shaped surface in contact with an activation switch or anti-drip valve mechanism.

Figure 2:
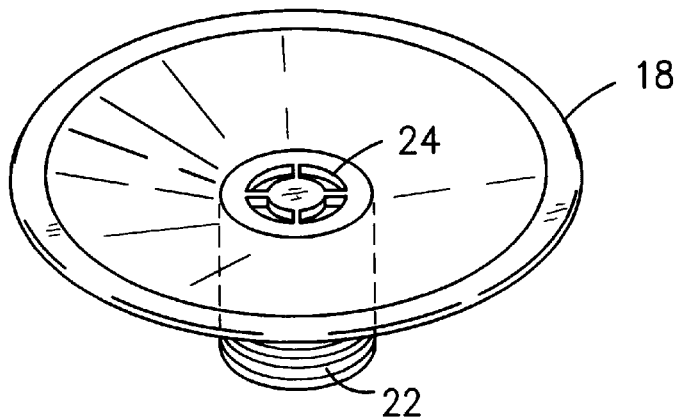
FIG. 2 is a perspective view of the hollow screw or cylinder with a substantially flat or conically-shaped surface at its upper end.

With reference to FIG. 2, the hollow screw is threaded on its outside surface with the substantially flat or conically-shaped surface attached at its upper end. The substantially flat or conically-shaped surface 18 has holes 24 that fit above the hollow portion of screw 22. Flow from the output spout of a coffee maker is directed onto the substantially flat or conically shaped surface 18 and into holes 24, thus filling a carafe 12.

Figure 3:
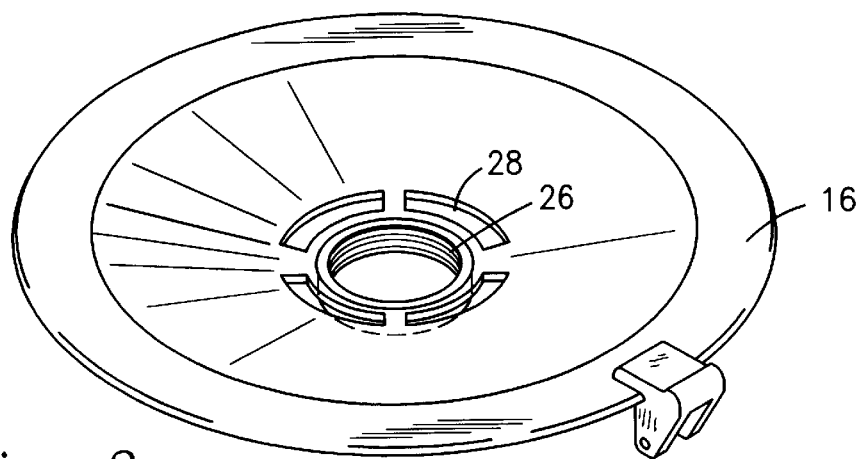
FIG. 3 is a perspective view of the lid.

FIG. 3 shows the internally threaded bore 26 located in the center of the lid, through which the screw 22 is threaded. The lid 16 may have holes 28 radially spaced in a recessed area of the lid to direct overflow spillage from the substantially flat or conically-shaped surface 18 into a carafe 12.

Figure 4:
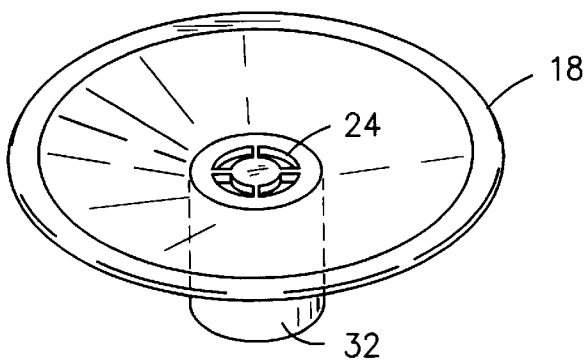
FIG. 4 is a perspective view of the device to selectively change the height of a coffee carafe incorporating a frictional adjustment means, the device being shown in position on a carafe.
Figure 4:
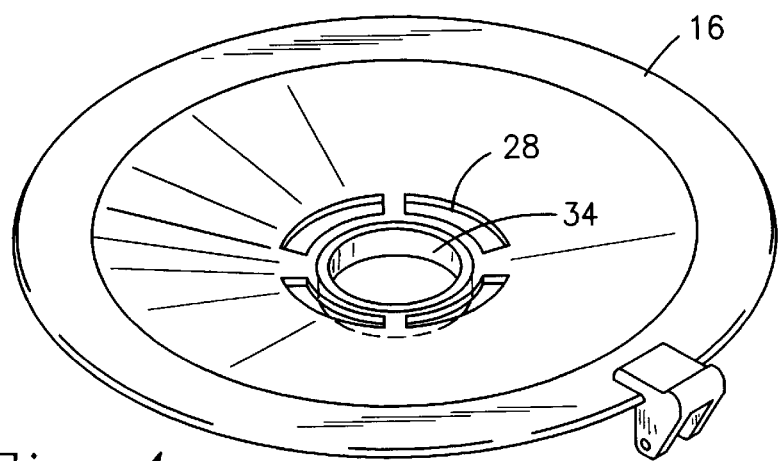

With reference to FIG. 4, the alternative embodiment of the present invention, coffee carafe lid 30, utilizing frictional means between cylinder 32 and bore 34 for adjusting the height of the substantially flat or conically-shaped surface 18 is depicted.

The carafe itself may be of any desired shape. Preferably, it is a conventional round carafe with a flat bottom and smaller diameter top portion to accommodate the lid of this invention. It may be made of glass, metal, or heat resistant plastic material. The carafe may also have a handle to facilitate handling a carafe containing hot coffee or other drinkable liquids. The smaller diameter top portion of the carafe may have a depressed lip for ease of pouring the liquid from the carafe into a cup, bowl, or other container.

The carafe can be any size but would typically be a standard 10 or 12 cup size, as these two sizes are typically used with coffee makers. The invention could work equally well with any size carafe. The device 10 has a hinged end 14 that is detachably connected to the hinge connection on the carafe 12.

In the preferred embodiment, the device 10 is placed on the carafe opening and the substantially flat or conically-shaped surface 18 is elevated or depressed by rotation of the substantially flat or conically-shaped surface 18. This surface is then positioned immediately underneath the output spout of the coffee maker. Should the coffee maker have an activation switch or anti-drip valve mechanism, then the substantially flat or conically-shaped surface height is further adjusted to contact and activate the switch or to effectively engage the anti-drip valve mechanism when the carafe is placed in the coffee maker.

Preferably, the lid 16 has holes 28 radially spaced within a recessed area of the lid 16 so as to divert overflow spillage from the upper surface 18 into a carafe 12.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A coffee carafe comprising, in combination:

a coffee carafe;

a lid a coffee carafe; engaging said coffee carafe and having an internally threaded bore located at the center of the lid;

a hollow screw with external threads operationally mateable to the internally threaded bore at the center of the lid and having one of a substantially flat surface and a substantially conically-shaped surface at the top end of the hollow screw; said lid is hingedly detachably connected to the carafe; and one of said substantially flat surface and said conically-shaped surface has holes overlying the hollow screw.

2. A coffee carafe according to claim 1, wherein the height of one of said substantially flat surface and said substantially conically-shaped surface is adjusted by rotating one of said substantially flat surface and said conically-shaped surface to elevate or depress the screw.

3. A coffee carafe according to claim 1, wherein the lid has a plurality of holes radially spaced within a recessed area for diverting overflow spillage into the carafe.

4. A coffee carafe comprising, in combination:

a coffee carafe;

a lid a engaging said coffee carafe and having an internal bore located at the center of the lid;

a hollow cylinder frictionally fitted within the internal bore located at the center of the lid and having one of a substantially flat surface and a substantially conically-shaped surface at the top end of the hollow cylinder;

said lid is hingedly detachably connected to the carafe; and said one of said substantially flat surface and said conically-shaped surface has holes overlying the hollow cylinder.

5. A coffee carafe according to claim 4, wherein the height of one of the substantially flat surface the substantially conically-shaped surface is adjusted by elevating or depressing the cylinder.

6. A coffee carafe according to claim 4, wherein the lid has a plurality of holes radially spaced within a recessed area for diverting overflow spillage into the carafe.

* * * * *

UNITED STATES PATENT AND TRADEMARK OFFICE
CERTIFICATE OF CORRECTION

PATENT NO : 5,931,329
DATED : August 3, 1999
INVENTOR(S) : Hsinhan Wu

It is certified that error appears in the above-identified patent and that said Letters Patent is hereby corrected as shown below:

Col. 4 line 21
 delete "a coffee carafe;"

Col. 4 line 42
 after lid, delete "a"

Signed and Sealed this

Thirtieth Day of November, 1999

Q. TODD DICKINSON

Attest:

Attesting Officer

Acting Commissioner of Patents and Trademarks